(12) United States Patent
Feng et al.

(10) Patent No.: US 10,402,415 B2
(45) Date of Patent: Sep. 3, 2019

(54) INTELLIGENTLY DISTRIBUTED STAGE DATA MINING SYSTEM

(71) Applicant: ZHEJIANG DAFENG INDUSTRY CO., LTD., Yuyao (CN)

(72) Inventors: Hua Feng, Yuyao (CN); Qiyun Feng, Yuyao (CN); Zhen Liu, Yuyao (CN); Haihong Tian, Yuyao (CN); Dong Wang, Yuyao (CN); Lifeng Wu, Yuyao (CN)

(73) Assignee: ZHEJIANG DAFENG INDUSTRY CO., LTD, Yuyao, Zhejiang Province (CN)

( * ) Notice: Subject to any disclaimer, the term of this patent is extended or adjusted under 35 U.S.C. 154(b) by 458 days.

(21) Appl. No.: 15/188,816

(22) Filed: Jul. 10, 2016

(65) Prior Publication Data
US 2017/0140004 A1    May 18, 2017

(30) Foreign Application Priority Data

Jul. 22, 2015   (CN) .......................... 2015 1 0433940
Jul. 22, 2015   (CN) ..................... 2015 2 0535333 U

(51) Int. Cl.
| | |
|---|---|
| *G06F 16/2458* | (2019.01) |
| *G06F 16/22* | (2019.01) |
| *H04L 29/12* | (2006.01) |
| *H04W 4/80* | (2018.01) |
| *H04W 84/12* | (2009.01) |

(52) U.S. Cl.
CPC .......... *G06F 16/2465* (2019.01); *G06F 16/22* (2019.01); *H04L 61/6059* (2013.01); *H04W 4/80* (2018.02); *H04W 84/12* (2013.01)

(58) Field of Classification Search
CPC ......... G06F 17/30312; G06F 17/30539; G06F 16/2465; G06F 16/22; H04L 61/6059; H04W 4/80; H04W 84/12
USPC .......................................................... 707/776
See application file for complete search history.

(56) References Cited

U.S. PATENT DOCUMENTS

| | | | |
|---|---|---|---|
| 5,774,638 A * | 6/1998 | Kageyama | ............ G06F 3/1296 345/505 |
| 8,543,893 B2 * | 9/2013 | Hedaoo | ................. H03M 13/05 714/776 |
| 2003/0220835 A1 * | 11/2003 | Barnes, Jr. | ......... G06Q 10/1053 705/14.36 |

(Continued)

*Primary Examiner* — Phong H Nguyen
(74) *Attorney, Agent, or Firm* — Lawrence S. Cohen

(57) ABSTRACT

An intelligently distributed stage data mining system is disclosed herein, including an intelligent central server, a first WLAN receiving and transmitting unit, a local cluster control unit, a second WLAN receiving and transmitting unit, a third WLAN receiving and transmitting unit, a self-adaptive multi-dimensional transmission processing unit, a plurality of ZigBee receiving and transmitting units and a distributed data extraction unit. The intelligent central server is used for sending data acquisition and stage correction instruction to the local cluster control unit, and for receiving the stage real-time data uploaded by the self-adaptive multi-dimensional transmission processing unit. The local cluster control unit is used for receiving the data acquisition instruction sent by the intelligent central server, and forwarding instructions to the self-adaptive multi-dimensional transmission processing unit.

5 Claims, 11 Drawing Sheets

(56) References Cited

U.S. PATENT DOCUMENTS

| | | | |
|---|---|---|---|
| 2004/0081394 A1* | 4/2004 | Biran | H04L 41/00 385/31 |
| 2005/0136949 A1* | 6/2005 | Barnes, Jr. | G06Q 10/1053 455/461 |
| 2011/0055666 A1* | 3/2011 | Hedaoo | H03M 13/05 714/776 |
| 2012/0070086 A1* | 3/2012 | Miyamoto | G06K 9/325 382/195 |
| 2015/0215188 A1* | 7/2015 | Bae | H04L 12/427 370/246 |
| 2015/0234636 A1* | 8/2015 | Barnes, Jr. | G06F 3/167 715/728 |
| 2015/0256468 A1* | 9/2015 | Hiramoto | H04L 47/28 370/235 |

\* cited by examiner

INTELLIGENTLY DISTRIBUTED STAGE DATA MINING SYSTEM

FIELD OF THE PATENT APPLICATION

The present patent application relates to a stage control field, in particular, to an intelligently distributed stage data mining system.

BACKGROUND

As the sci-tech elements of scenes from large performances are increasingly rich, the quantity of equipment and personnel in the field has doubled and redoubled, so the control and management of the equipment and personnel has become more and more complicated.

In prior art, the stage equipment and personnel are mainly controlled manually. Mostly, the wiring mode is also a wired mode, and even though some are wireless wiring modes, subsystems of the stage are mutually independent, the operation of which is hard to coordinate. The data collected by each subsystem is also mutually independent, which may scramble for bandwidth, and it is challenging to evaluate the overall data volume, thus leading to a lower accuracy of stage control, an unsatisfactory stage effect, and sometimes, even potential safety hazards which are difficult to be discovered manually in a timely manner.

SUMMARY

The present patent application provides an intelligently distributed stage data mining system as described herein. The intelligently distributed stage data mining system includes an intelligent central server, a first WLAN receiving and transmitting unit, a local cluster control unit, a second WLAN receiving and transmitting unit, a third WLAN receiving and transmitting unit, a self-adaptive multi-dimensional transmission processing unit, a plurality of ZigBee receiving and transmitting units, and a distributed data extraction unit.

The intelligent central server is used for sending data acquisition and stage correction instruction to the local cluster control unit, and receiving the stage real-time data uploaded by the self-adaptive multi-dimensional transmission processing unit.

The local cluster control unit is used for receiving the data acquisition instruction sent by the intelligent central server, and forwarding instruction to the self-adaptive multi-dimensional transmission processing unit.

The self-adaptive multi-dimensional transmission processing unit is used for acquiring the data acquired by the distributed data extraction unit and uploading the data to the intelligent central server according to the data transmission instruction of the local cluster control unit.

The distributed data extraction unit is used for real-time acquisition of relevant data of the stage performance.

Optionally, the self-adaptive multi-dimensional transmission processing unit comprises a direct memory access unit, a plurality of transit storage units, a data type identification unit, an IP address matching unit and a data volume detection unit. The direct memory access unit is used for receiving the data transmission instruction of the local cluster control unit, and controlling the transit storage unit, data type identification unit, IP address matching unit and data volume detection unit. The data type identification unit is used for recognizing the type of the received data. The IP address matching unit is used for matching the received data with the pre-assigned IPv6 address, to determine accurate data sources. The transit storage unit is used for storing data submitted by the stage equipment data extraction unit, stage personnel data extraction unit and the stage field data extraction unit, according to the data types and the matched IPv6 address. The data volume detection unit is used for detecting the data volume of the transmitted data.

Optionally, the direct memory access unit comprises a buffering relay unit, which comprises a first first-in first-out buffer and a second first-in first-out buffer.

Optionally, the direct memory access unit further comprises a finite high-speed storage collection, which comprises two sets of configuration registers and a set of state registers. The two sets of configuration registers are used to control each data stream communication of the self-adaptive multi-dimensional transmission processing unit in turn, and the set of state register is used to start the self-adaptive multi-dimensional transmission processing unit and reflect the transmission state of the self-adaptive multi-dimensional transmission processing unit.

Optionally, the direct memory access unit further comprises an interface control sequence unit, which comprises a state recognizer. When the self-adaptive multi-dimensional transmission processing unit has access to the data extraction unit, the state recognizer directly controls the interface signal of receiving or transmitting data of the distributed data extraction unit, and detecting the working condition of the data extraction unit in a real-time manner.

Optionally, the data volume detection unit specifically comprises a transmission stream table establishing unit, a feature sequence acquisition unit, a memory, an analysis unit, a first decision unit, a second decision unit, and a third decision unit. The transmission stream table establishing unit is used for establishing a transmission stream table. The feature sequence acquisition unit is used for acquiring the feature sequence of various monitored transmission streams in the transport layer, and storing them in the memory. The analysis unit is used for analyzing the intercepted data packet header, to acquire its protocol type, source IP, source port, destination IP, destination port and datagram length. The first decision unit is used for determining if the source IP, source port, destination IP and destination port recorded in the transmission stream are the same as those of the data packet under the same protocol type in the transmission stream table. The second decision unit is used for deciding if the type of the transmission node of the transmission stream has been calibrated when the first decision unit decides a same storage situation. That is, if the first decision determines that the source and data parameters in the intercepted data packet header are the same as a data packet under the same protocol type stored in the transmission stream table (i.e., a "same storage situation"), then the second decision unit determines if the remaining parameters in the intercepted data packet header match data packet headers stored in the transmission stream table. Otherwise, the second decision unit records the direction of the data packet and datagram length in the transmission stream and uploads it to the transmission stream table as another intercepted data packet header record. The third decision unit is used for deciding if the intercepted data packet header record of the network data stream has reached a set threshold value of the number of data packets N. The threshold value N of the number of data packet records may be user selectable and may be varied for different recording sessions. If the number of data packets reaches the threshold value N, this indicates that the desired feature sequence of the transmission stream has been collected, and then the data mining system makes a record of the data transmission quantity in the stage via the intelligent central server.

The intelligently distributed stage data mining system described herein further includes an intelligent central server, a first WLAN receiving and transmitting unit, a local cluster control unit, a second WLAN receiving and transmitting unit, a third WLAN receiving and transmitting unit, a self-adaptive multi-dimensional transmission processing unit, a plurality of ZigBee receiving and transmitting units and a distributed data extraction unit. The intelligent central server connects with both the local cluster control unit and the self-adaptive multi-dimensional transmission processing unit through the first WLAN receiving and transmitting unit. The output end of the local cluster control unit connects with the self-adaptive multi-dimensional transmission processing unit through the second WLAN receiving and transmitting unit. The self-adaptive multi-dimensional transmission processing unit connects with the local cluster control unit through the second WLAN receiving and transmitting unit and connects with the distributed data extraction unit through the ZigBee receiving and transmitting unit. The distributed data extraction unit connects with the self-adaptive multi-dimensional transmission processing unit through a plurality of ZigBee receiving and transmitting units. The system can acquire and transmit the relevant information of a plurality of stage equipments and personnel dynamically in a real-time manner, thus improving the accuracy of stage control, achieving the control of data traffic, and reducing the potential safety hazards of the stage and enhancing the stage effect.

DETAILED DESCRIPTION

The present invention is described in combination with drawings and several preferred embodiments, but the invention is not limited to these embodiments. Any alternatives, modifications, equivalent methods and schemes made within the essence and scope of the invention shall fall within the scope of protection herein. In order to enable the public to have a thorough understanding of the invention, specific details are described in the preferred embodiments herein, but those skilled in the art can fully understand the invention without the description about these details.

Figure 1:
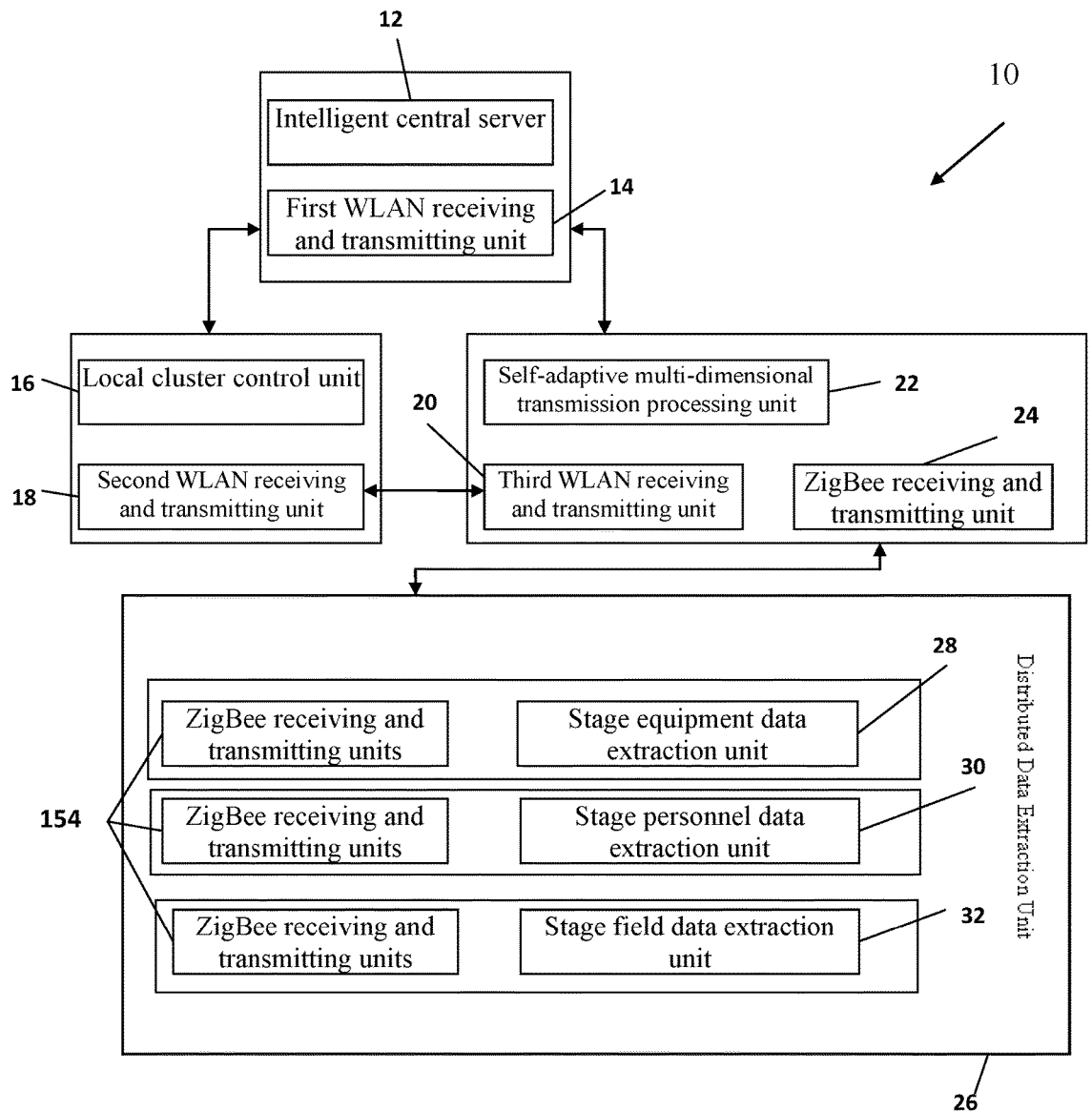
FIG. 1 is a schematic diagram of an embodiment of an intelligently distributed stage data mining system.

Referring to FIG. 1, an embodiment of the intelligently distributed stage data mining system 10 is shown. The system includes an intelligent central server 12, a first WLAN receiving and transmitting unit 14, a local cluster control unit 16, a second WLAN receiving and transmitting unit 18, a third WLAN receiving and transmitting unit 20, a self-adaptive multi-dimensional transmission processing unit 22, a ZigBee receiving and transmitting unit 24 and a distributed data extraction unit 26.

The intelligent central server 12 connects with the local cluster control unit 16 and the self-adaptive multi-dimensional transmission processing unit 22 through the first WLAN receiving and transmitting unit 14, the output end of the local cluster control unit connects with the self-adaptive multi-dimensional transmission processing unit 22 through the second WLAN receiving and transmitting unit 18, the self-adaptive multi-dimensional transmission processing unit 22 connects with the local cluster control unit 16 through the second WLAN receiving and transmitting unit 18 and connects with the distributed data extraction unit 26 through the ZigBee receiving and transmitting units 24, the distributed data extraction unit 26 connects with the self-adaptive multi-dimensional transmission processing unit 22 through a plurality of ZigBee receiving and transmitting units 154.

The intelligent central server 12 is used for sending data acquisition and stage correction instruction to the local cluster control unit 16, and receiving the stage real-time data uploaded by the self-adaptive multi-dimensional transmission processing unit 22.

The local cluster control unit 16 is used for receiving the data acquisition instruction sent by the intelligent central server 12, and forwarding the instruction to the self-adaptive multi-dimensional transmission processing unit 22.

The self-adaptive multi-dimensional transmission processing unit 22 is used for acquiring the data acquired by the distributed data extraction unit 26 and uploading the data to the intelligent central server 12, according to the data transmission instruction of the local cluster control unit 16.

The distributed data extraction unit 26 is used for real-time acquisition of relevant data of the stage performance.

In an embodiment of the invention, the distributed data extraction unit 26 includes a stage equipment data extraction unit 28, a stage personnel data extraction unit 30 and a stage field data extraction unit 32.

The stage equipment data extraction unit 28 is used for extracting the real-time operating data relevant to the stage equipments.

The stage personnel data extraction unit 30 is used for extracting the real-time execution data relevant to the stage performers, and the stage field data extraction unit 32 is used for extracting the dynamic data relevant to the stage field.

Figure 2:
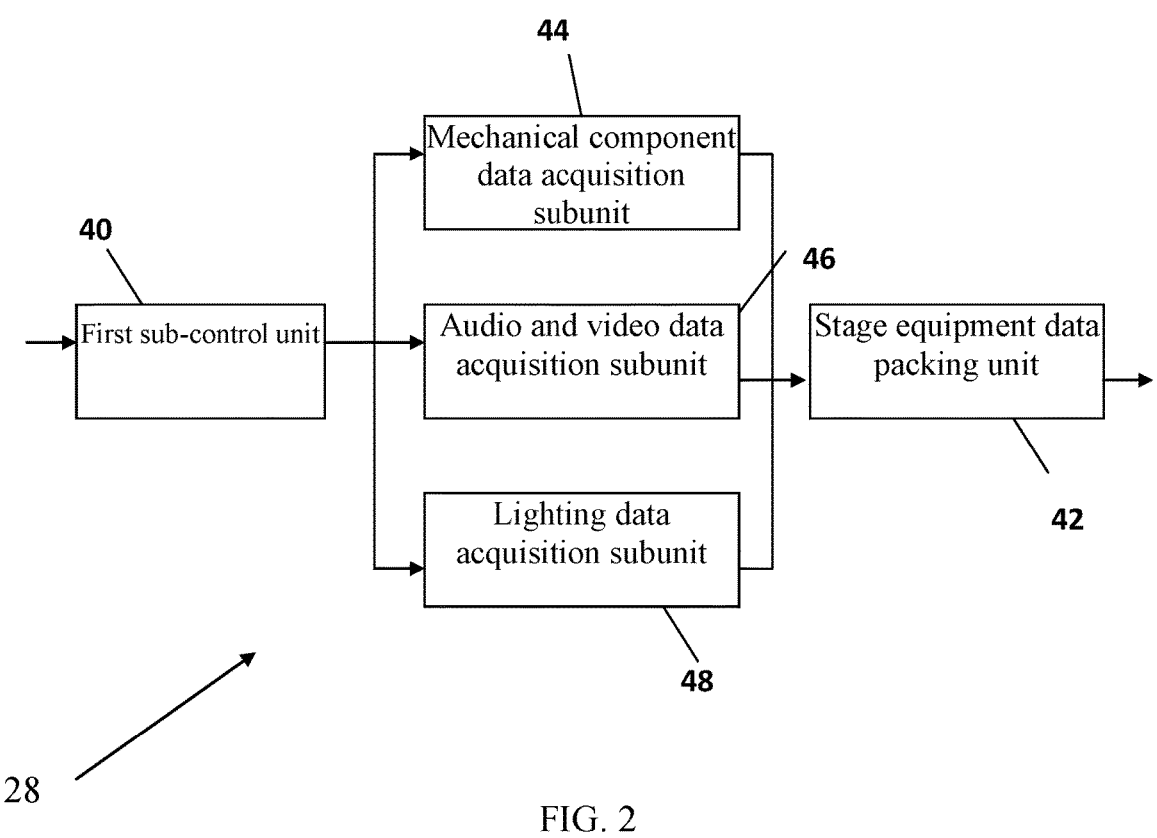
FIG. 2 is a schematic diagram of an embodiment of a stage equipment data extraction unit.

Referring to FIG. 2, in an exemplary embodiment of the invention, the stage equipment data extraction unit 28 specifically includes a first sub-control unit 40, a stage equipment data packing unit 42, a mechanical component data acquisition sub-unit 44, an audio and video data acquisition sub-unit 46, and a lighting data acquisition sub-unit 48.

The first sub-control unit 40 is used for receiving the data acquisition instruction sent by the local cluster control unit 16, and instructing the mechanical component data acquisition sub-unit 44, the audio and video data acquisition sub-unit 46 and the lighting data acquisition sub-unit 48 to acquire corresponding data according to the instruction.

The stage equipment data packing unit 42 is used for packing the corresponding data acquired by the mechanical component data acquisition sub-unit 44, the audio and video data acquisition sub-unit 46 and the lighting data acquisition sub-unit 48, and upload them to the self-adaptive multi-dimensional transmission processing unit 22.

The mechanical component data acquisition sub-unit 44 is used for acquiring the sensing information of the mechanical parts connected periodically, and the sensing information includes the three-dimensional coordinates of the stage of the mechanical parts and the operating state.

The audio and video data acquisition sub-unit 46 is used for acquiring the play message of audio and video of the stage in a real-time manner.

The lighting data acquisition sub-unit 48 is used for acquiring the operating information of the stage light in a real-time manner.

Figure 7:
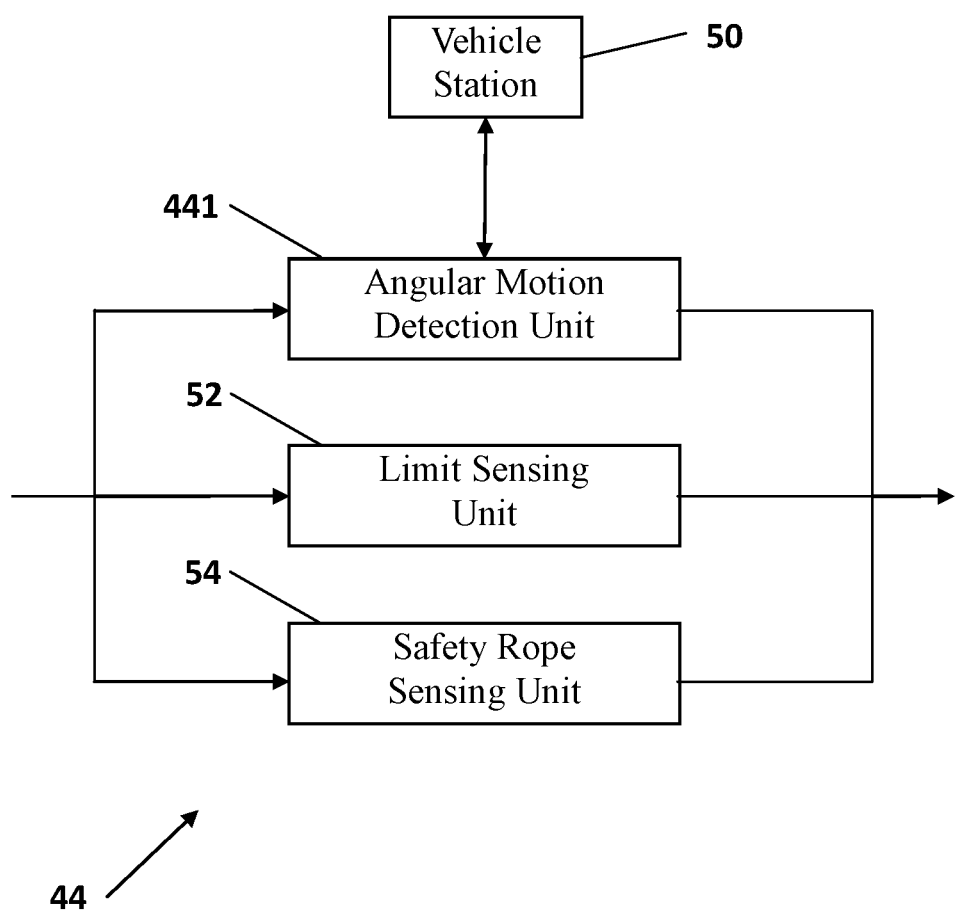
FIG. 7 is a schematic diagram of an embodiment of a mechanical component data acquisition subunit.

Referring to FIG. 7, an embodiment of the, mechanical component data acquisition sub-unit 44 specifically includes: an angular motion detection unit 441 connected to a vehicle station 50, which is used for calculating the position and speed of the vehicle station in a real-time manner, and sending them to the stage equipment data packing unit as sensing information; a limit sensing unit 52, which is used for sending limit alarm information to the stage equipment data packing unit when detecting that the position of the corresponding vehicle station reaches the limit height; and a safety rope sensing unit 54, which is used for sending rope-release alarm information to the stage equipment data packing unit when detecting that the degree of tightness of the safety rope of the corresponding vehicle station reaches the set threshold value.

The stage equipment data packing unit 42 reports the received limit alarm information or rope-release alarm information to the intelligent central server through the self-adaptive multi-dimensional transmission processing unit.

The intelligent central server 12 is further used for stopping the operation of the vehicle station after receiving the limit alarm information or the rope-release alarm information.

Figure 8:
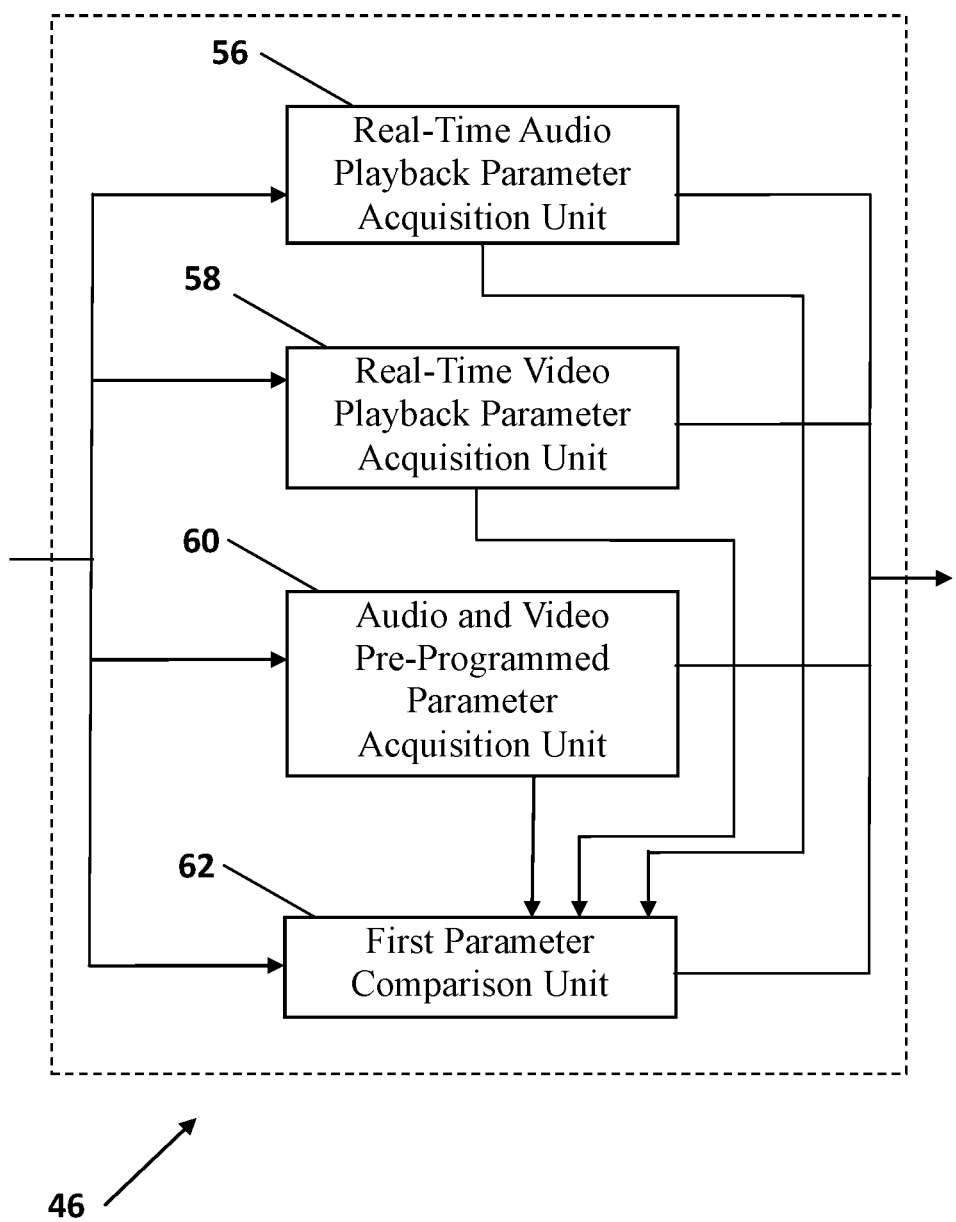
FIG. 8 is a schematic diagram of an embodiment of an audio and video data acquisition subunit.

Referring to FIG. 8, an embodiment of the audio and video data acquisition sub-unit 46 specifically includes a real-time audio playback parameter acquisition unit 56, a real-time video playback parameter acquisition unit 58, an audio and video pre-programmed parameter acquisition unit 60, and a first parameter comparison unit 62.

The real-time audio playback parameter acquisition unit and the real-time video playback parameter acquisition unit are used for real-time acquisition of the audio and video parameters played during the stage performance, and the parameters include, but are not limited to, tone, cracking voice, height, delay, synchronization and other information.

The audio and video pre-programmed parameter acquisition unit is used for acquiring the relevant video and audio parameters to be played during the performance in advance from the intelligent central server.

The first parameter comparison unit is used for comparing the acquired real-time audio and video parameters with the pre-programmed audio and video parameters acquired in advance. When they are not corresponding, abnormal information of audio and video playing is generated, and these abnormal information and real-time parameters will be reported to the intelligent central server through the self-adaptive multi-dimensional transmission processing unit.

The intelligent central server 12 is further used for correcting the audio and video playing parameters after receiving the abnormal information and real-time parameters, and sending them to the audio and video playing unit.

Figure 9:
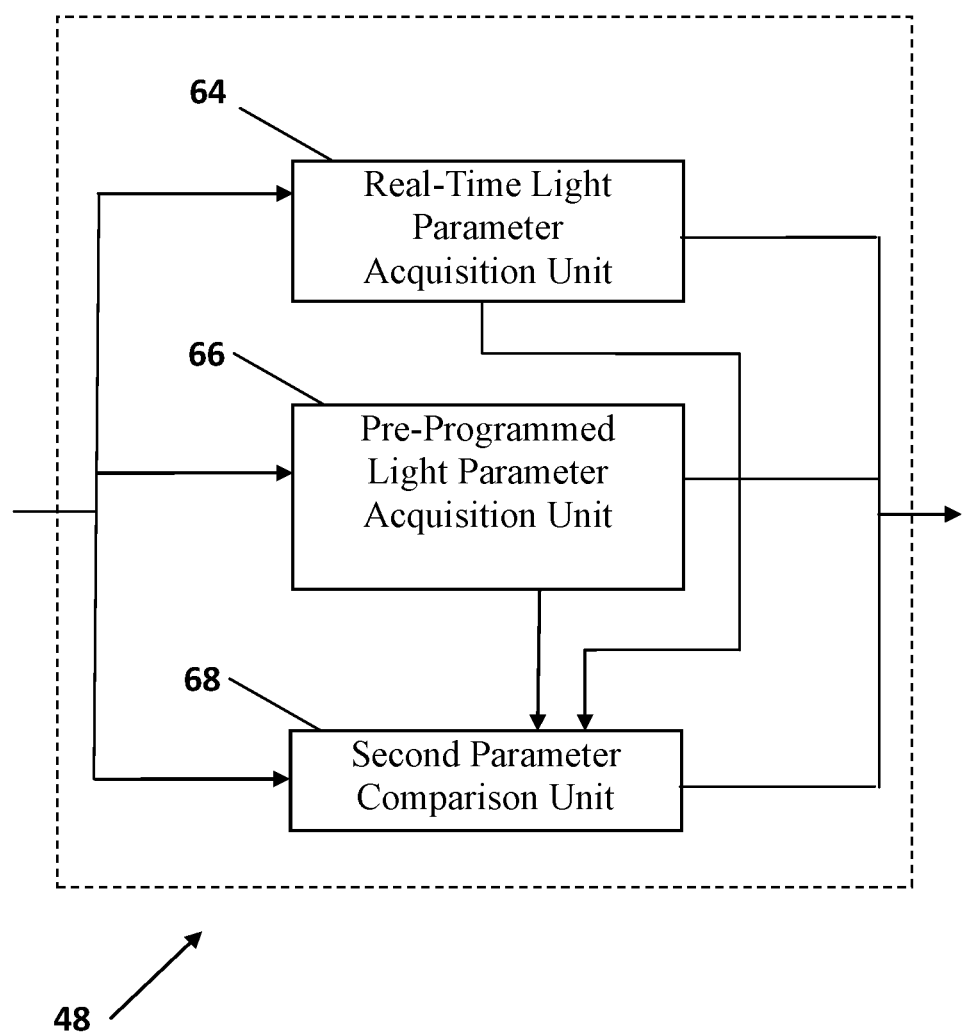
FIG. 9 is a schematic diagram of an embodiment of a lighting data acquisition subunit.

Referring to FIG. 9, an embodiment of the lighting data acquisition sub-unit 48 specifically includes a real-time light parameter acquisition unit 64, a pre-programmed light parameter acquisition unit 66, and a second parameter comparison unit 68, wherein:

The real-time light parameter acquisition unit is used for acquiring real-time light parameters used during the stage performance, and the parameters include but are not limited to luminance, color, synchronization, follow spot position and other information.

The pre-programmed light parameter acquisition unit is used for acquiring the relevant light parameters needed during the performance in advance from the intelligent central server 12.

The second parameter comparison unit is used for comparing acquired real-time light parameters with the pre-programmed light parameters acquired in advance. When they are not corresponding, abnormal light information is generated, and the abnormal light information and real-time light parameters will be reported to the intelligent central server 12 through the self-adaptive multi-dimensional transmission processing unit 22.

The intelligent central server 12 is further used for correcting the light parameters after receiving the abnormal information and real-time parameters, and sending them to each stage light unit.

Figure 3:
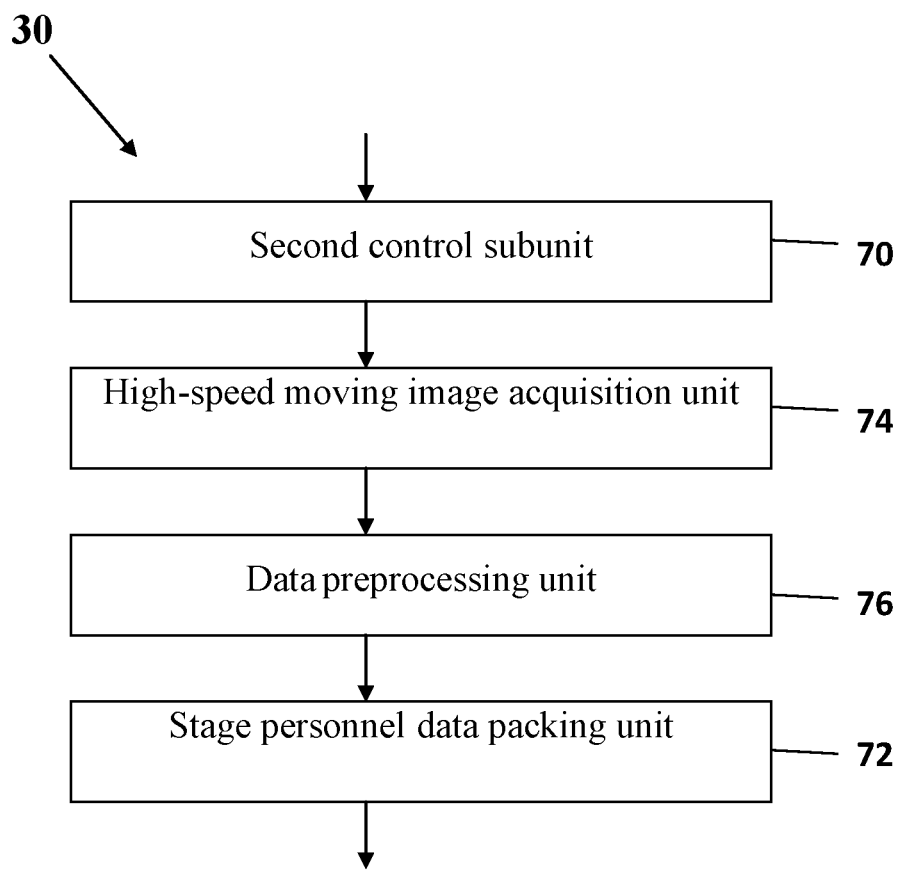
FIG. 3 is a schematic diagram of an embodiment of a stage personnel data extraction unit.

Referring to FIG. 3, the stage personnel data extraction unit 30 specifically includes: a second sub-control unit 70, a stage personnel data packing unit 72, a high-speed moving image acquisition unit 74, and a data preprocessing unit 76.

The second sub-control unit 70 is used for receiving the data acquisition instruction sent by the local cluster control unit 16, and instructing the high-speed moving image acquisition unit 74 to acquire corresponding data according to the instruction.

The high-speed moving image acquisition unit 74 is used for acquiring the body movement state of the performers and recording a video.

The data preprocessing unit 76 is used for receiving the data acquired by the high-speed moving image acquisition unit 74, extracting the key action frames, and recognizing and comparing the action sequence.

The stage personnel data packing unit 72 is used for packing the corresponding data of the data preprocessing unit 76 and uploading to the self-adaptive multi-dimensional transmission processing unit 22.

Figure 11:
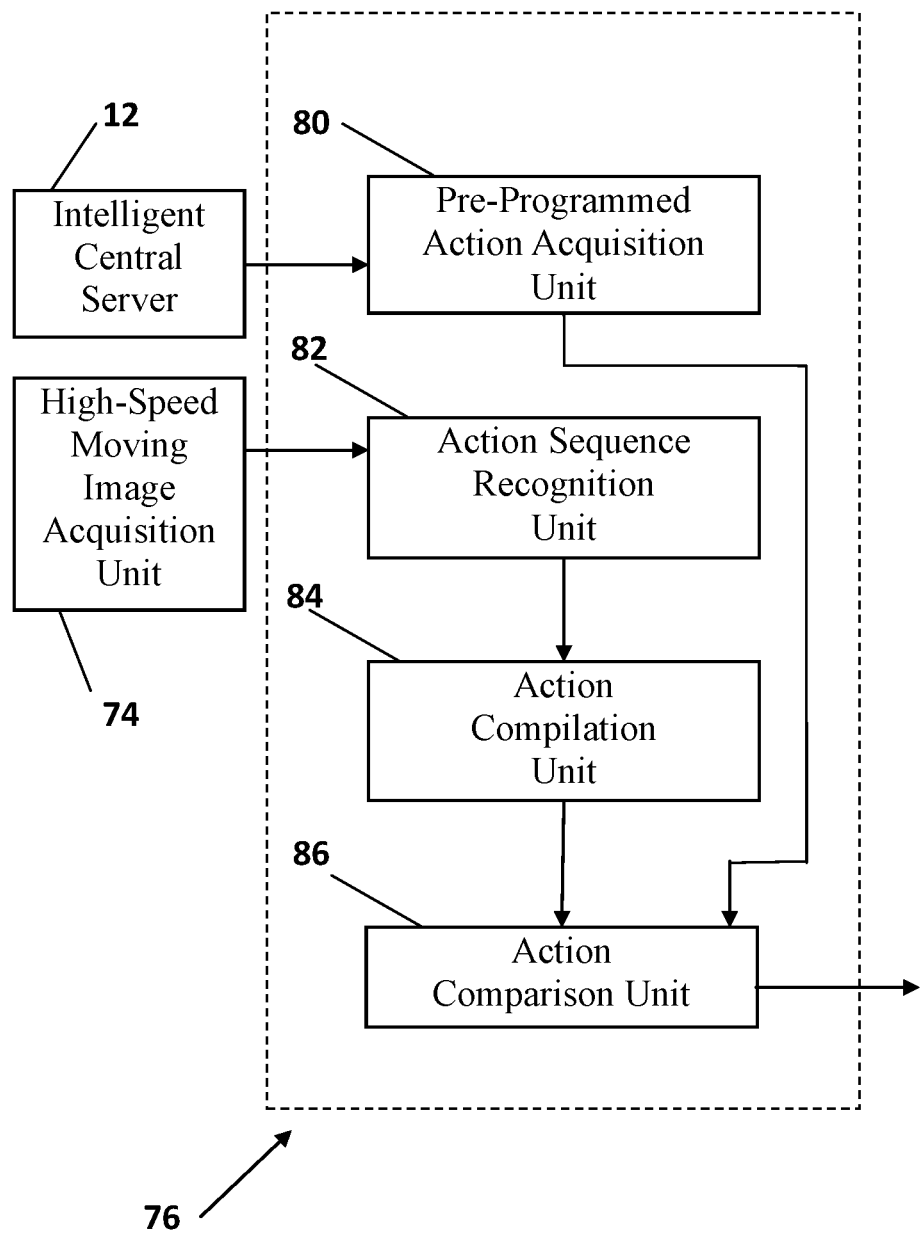
FIG. 11 is a schematic diagram of an embodiment of a data preprocessing unit.

In an exemplary embodiment as illustrated in FIG. 11 the data preprocessing unit 76 includes: a pre-programmed action acquisition unit 80, which is used for acquiring the standard action sequence of the performers needed during the performance from the intelligent central server 12; an action sequence recognition unit 82, which is used for angling the body motion state data acquired by the high-speed moving image acquisition unit 74, and extracting the key action frames; an action compilation unit 84, which is used for action compilation of the performers by use of the key action frames extracted by the action sequence recognition unit; and an action comparison unit 86, which is used for comparing the programmed action with the standard action sequence acquired by the pre-programmed action acquisition unit, and reporting the corresponding key action frame and comparison result to the intelligent central server 12 through the self-adaptive multi-dimensional transmission processing unit 22 when the comparison is not successful;

The intelligent central server 12 is further used for storing the key action frames after receiving the comparison result for follow-up improvement and learning.

Figure 4:
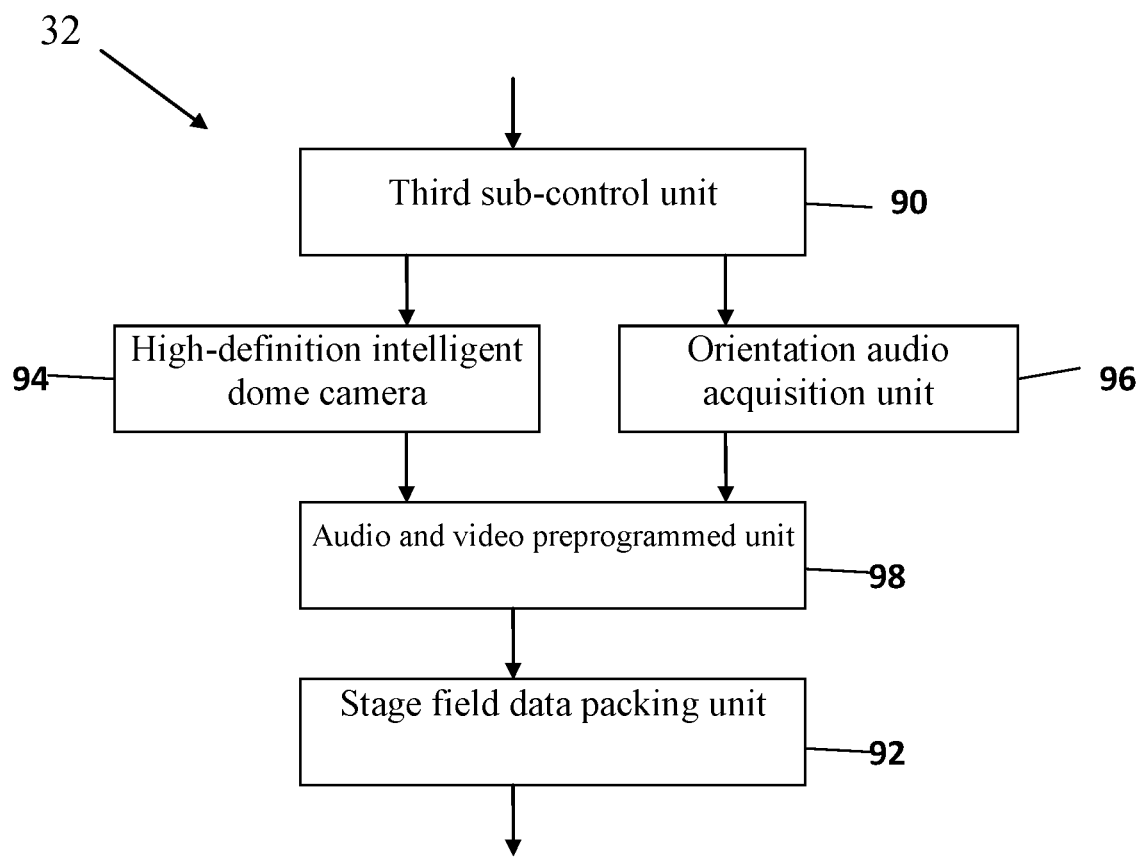
FIG. 4 is a schematic diagram of an embodiment of a stage field data extraction unit.

Referring to FIG. 4, an exemplary embodiment of the stage field data extraction unit 32 specifically includes a third sub-control unit 90, a stage field data packing unit 92, a plurality of high-definition intelligent dome cameras 94, a plurality of orientation audio acquisition units 96, and an audio and video pre-processing unit 98.

The third sub-control unit 90 is used for receiving the data acquisition instruction sent by the local cluster control unit 16, and instructing the high-definition intelligent dome camera 94 to acquire corresponding data according to the instruction.

The high-definition intelligent dome cameras 94 are used for acquiring the real-time images of the performance site, and acquiring relevant information including audience flow and crowd density, etc.

The orientation audio acquisition units 96 are used for acquiring the background noises of the performance site, and acquiring relevant information including noise intensity, noise location, etc.

The audio and video pre-processing unit 98 is used for compressed encoding of the acquired audio and video data.

The stage field data packing unit 92 is used for packing the audio and video data after compressed encoding by the audio and video pre-processing unit and uploading the data to the self-adaptive multi-dimensional transmission processing unit 22.

Figure 5:
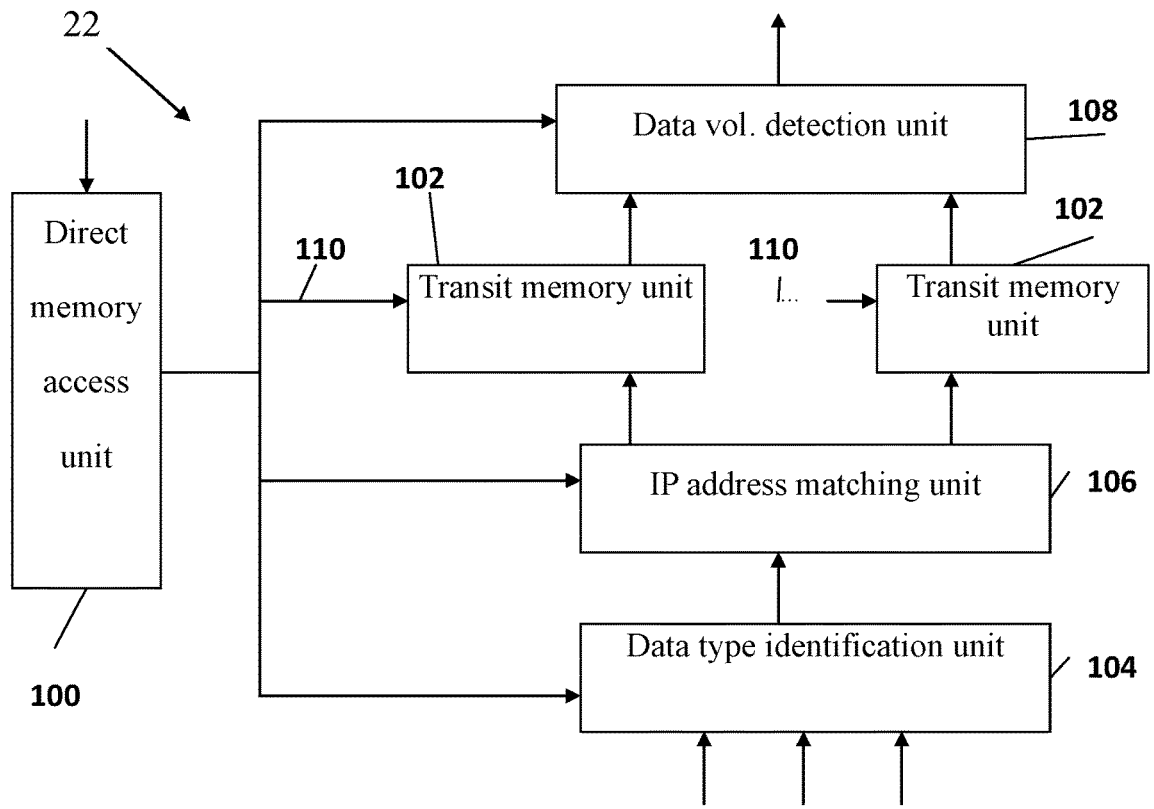
FIG. 5 is a schematic diagram of an embodiment of a self-adaptive multi-dimensional transmission processing unit.

Referring to FIG. 5, an exemplary embodiment of the self-adaptive multi-dimensional transmission processing unit 22 includes a direct memory access unit 100, a plurality of transit memory units 102, a data type identification unit 104, an IP address matching unit 106 and a data volume detection unit 108.

The direct memory access unit 100 is used for receiving the data transmission instruction of the local cluster control unit 16, and controlling the transit storage unit 102, the data type identification unit 104, the IP address matching unit 106 and the data volume detection unit 108.

The data type identification unit 104 is used for identifying the type of received data, for example, whether personnel data or equipment data, etc.

The IP address matching unit 106 is used for matching the received data with the pre-assigned IPv6 address, to determine accurate data sources.

The transit storage unit 102 is used for sorted storing of the data submitted by the stage equipment data extraction unit 28, stage personnel data extraction unit 30 and stage field data extraction unit 32 according to the data types and the matched IPv6 address.

The data volume detection unit 108 is used for detecting the data volume of the transmitted data.

Figure 10:
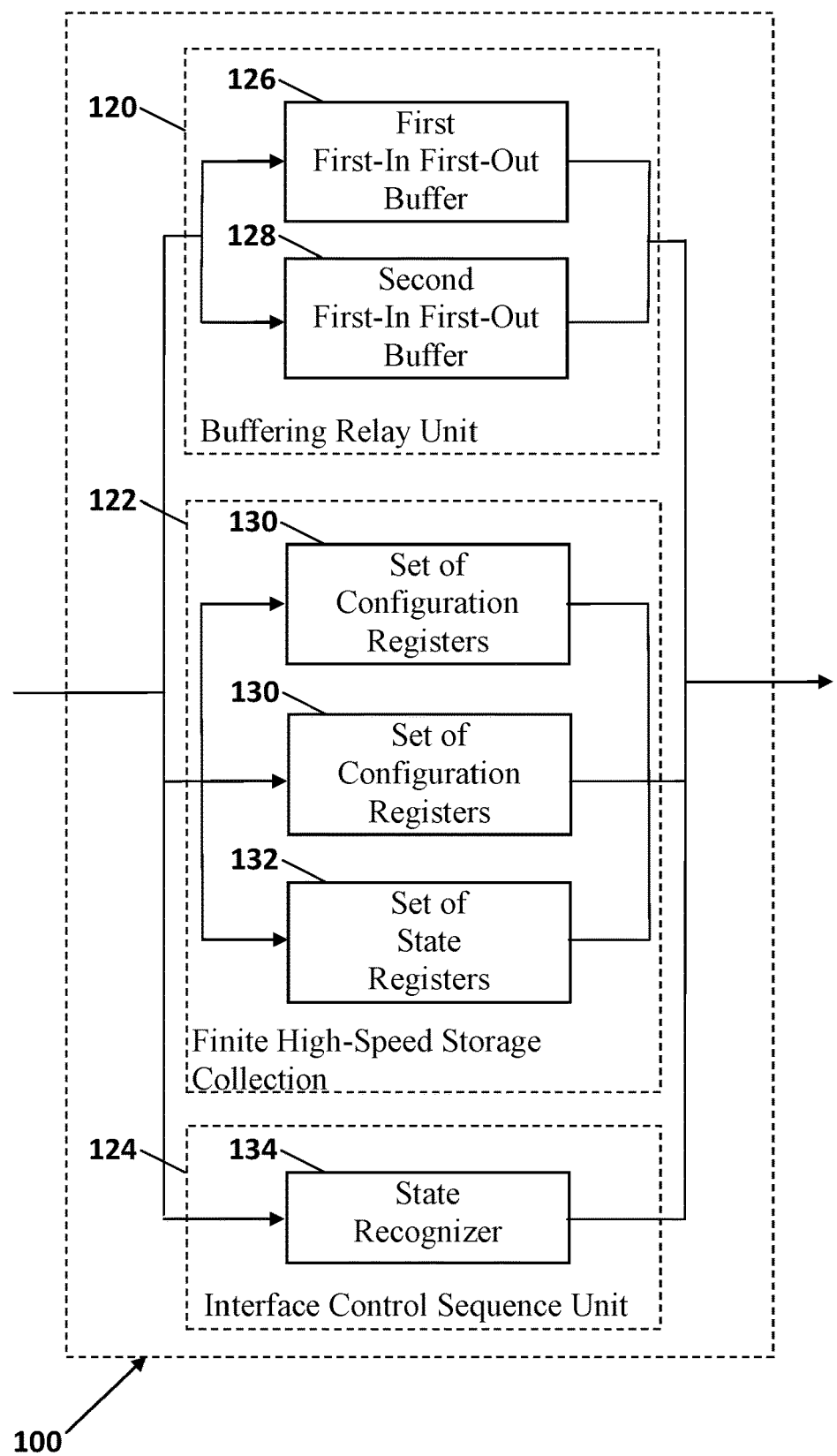
FIG. 10 is a schematic diagram of an embodiment of a direct memory access unit.

A first data transmission channel 110 is arranged between the transit memory unit 102 and the direct memory access unit 100; a second data transmission channel 112 is arranged between each data extraction unit of the distributed data extraction unit 26, (i.e., the stage equipment data extraction unit 28, the stage personnel data extraction unit 30 and the stage field data extraction unit 32) and the direct memory access unit 100; a third data transmission channel 114, is arranged between the transit storage unit 102 and the intelligent central server 12; and a fourth data transmission channel 116 is arranged between the direct memory access unit 100 and the local cluster control unit 16;

Referring to FIG. 10, an exemplary embodiment of the direct memory access unit 100 consists of a buffering relay unit 120, a finite high-speed storage collection 122 and an interface control sequence unit 124.

The buffering relay unit consists of a first first-in first-out buffer 126 and a second first-in first-out buffer 128, wherein the first first-in first-out buffer is used to buffer the data read from the transit storage unit 102 to the intelligent central server 12, and the second first-in first-out buffer is used to buffer data written from each data extraction unit 26 to the transit storage unit 102. When data stream communication occurs between transit storage units, the system will use a first first-in first-out buffer or a second first-in first-out buffer.

The finite high-speed storage collection consists of two sets of configuration registers 130 and a set of state registers 132, the two sets of configuration registers are used to control each data stream communication of the self-adaptive multi-dimensional transmission processing unit 22, in turn, wherein each set of configuration registers is, at the least, used to configure the type of data stream channel in each data stream communication, the type of data extraction unit, the sending address and/or receiving address of the transit storage unit, and the transmission data length; and the set of state registers is used to start the self-adaptive multi-dimensional transmission processing unit and reflect the transmission state of the self-adaptive multi-dimensional transmission processing unit 22, wherein the transmission state, at a minimum, reflects if the transmission is completed.

The interface control sequence unit consists of a state recognizer 134. When the self-adaptive multi-dimensional transmission processing unit 22 has access to the data extraction unit, the state recognizer directly controls the interface signal of receiving or transmitting data of the data extraction unit according to the states and state transitions, and detecting the working condition of the data extraction unit in a real-time manner.

Figure 6:
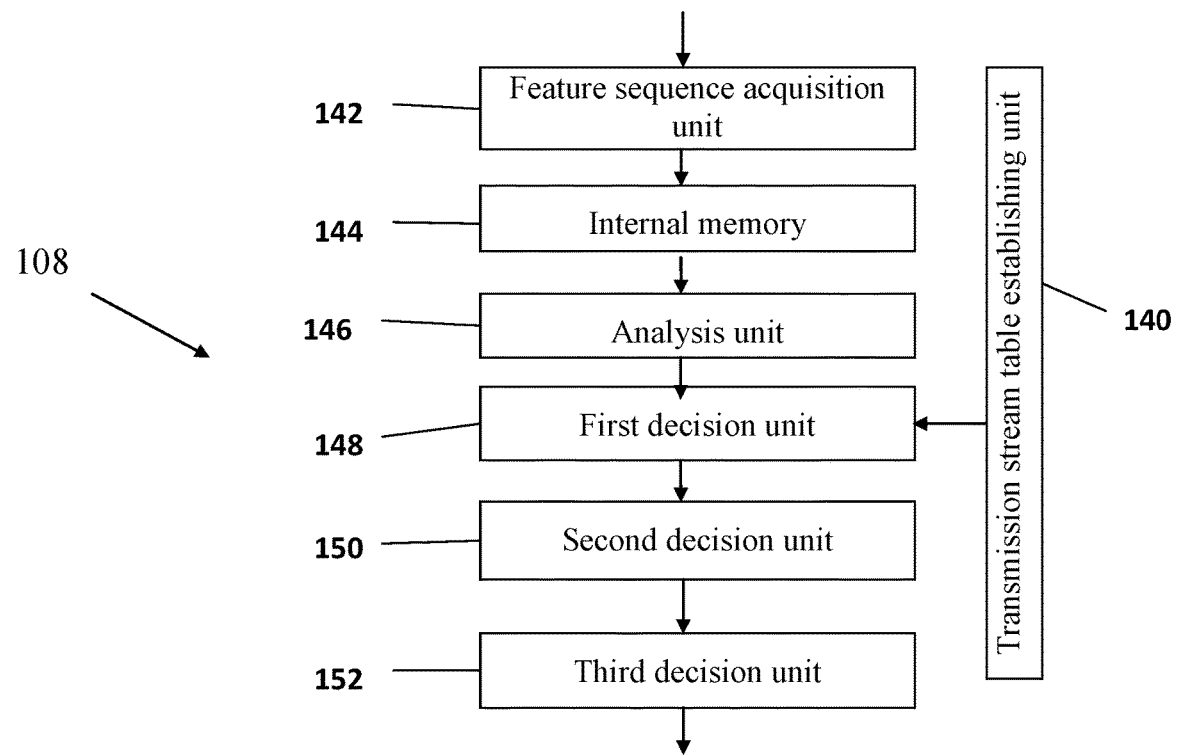
FIG. 6 is a schematic diagram of an embodiment of a data volume detection unit.

Referring to FIG. 6, an exemplary embodiment of the data volume detection unit 108 specifically includes a transmission stream table establishing unit 140, a feature sequence acquisition unit 142, an internal memory 144, an analysis unit 146, a first decision unit 148, a second decision unit 150 and a third decision unit 152.

The transmission stream table establishing unit 140 is used for establishing a transmission stream table, of which the structure attributes include: type of transmission node, protocol type, source IP, source port, destination IP, destination port, direction of data packet, and datagram length.

The feature sequence acquisition unit 142 is used for acquiring the feature sequence of various monitored transmission streams in the transport layer, and storing them in the internal memory 144.

The analysis unit 146 is used for analyzing the intercepted data packet header, to acquire its protocol type, source IP, source port, destination IP, destination port and datagram length.

The first decision unit 148 is used for inquiring if the source IP, source port, destination IP and destination port recorded in the transmission stream are the same as those of the data packet under the same protocol type in the transmission stream table.

The second decision unit 150 is used for deciding if the type of the transmission node of the transmission stream has been calibrated when the first decision unit 148 decides a same storage situation. Otherwise, it records the direction of the data packet and datagram length in the transmission stream and loads them in the transmission stream table.

The third decision unit 152 is used for deciding if the data packet record of the network data stream reaches the set threshold value of number of data packet N. If the threshold value N is reached, the third decision unit shows the feature sequence of the transmission stream has been collected, then it makes a record of the data transmission quantity in the stage.

The above embodiments do not describe all details nor limit the scope of the invention. A person of ordinary skill in the art would understand that many modifications and variations can be made according to the above descriptions. These embodiments in the description are to explain the principle and actual application of the invention, so that a person skilled in the art can make good use of the embodiments as described or change the embodiments. The scope of the invention is limited only by the claims and their full scope and equivalents.

The invention claimed is:

1. An intelligently distributed stage data mining system comprising at least one processor coupled to a memory comprising:
   an intelligent central server,
   a first wireless local area network (WLAN) receiving and transmitting unit,
   a local cluster control unit,
   a second WLAN receiving and transmitting unit,
   a third WLAN receiving and transmitting unit,
   a self-adaptive multi-dimensional transmission processing unit,
   a plurality of high-level communication protocol (ZigBee) receiving and transmitting units, and
   a distributed data extraction unit;
   wherein the intelligent central server is used for sending data acquisition instruction and stage correction instruction to the local cluster control unit, and receiving the stage real-time data uploaded by the self-adaptive multi-dimensional transmission processing unit;
   the local cluster control unit is used for receiving the data acquisition instruction sent by the intelligent central server, and forwarding instruction to the self-adaptive multi-dimensional transmission processing unit;
   the self-adaptive multi-dimensional transmission processing unit is used for acquiring the data acquired by the distributed data extraction unit and uploading it to the intelligent central server according to the data transmission instruction of the local cluster control unit; and
   the distributed data extraction unit is used for real-time acquisition of relevant data of the stage performance;
   wherein the self-adaptive multi-dimensional transmission processing unit comprises a data volume detection unit used for detecting the data volume of the transmitted data;
   wherein the data volume detection unit specifically comprises a transmission stream table establishing unit, a feature sequence acquisition unit, an internal memory, an analysis unit, a first decision unit, a second decision unit, and a third decision unit; wherein,
   the transmission stream table establishing unit is used for establishing a transmission stream table;
   the feature sequence acquisition unit is used for acquiring the feature sequence of various monitored transmission streams in the transport layer, and store them in the memory;
   the analysis unit is used for analyzing the intercepted data packet header, to acquire its protocol type, source internet protocol (IP), source port, destination IP, destination port and datagram length;
   the first decision unit is used for determining if the source IP, source port, destination IP and destination port recorded in the transmission stream are the same as those of the data packet under the same protocol type in the transmission stream table;
   the second decision unit is used for deciding if the type of the transmission node of the transmission stream has been calibrated when the first decision unit decides a same storage situation, if not, then recording the direction of the data packet and datagram length in the transmission stream and loading in the transmission stream table; and
   the third decision unit is used for deciding if the data packet record of the network data stream reaches the set threshold value of number of data packet, if reaching the threshold value, which shows the feature sequence of the transmission stream has been collected, then make a record of the data transmission quantity in the stage.

2. The system according to claim 1, wherein the self-adaptive multidimensional transmission processing unit further comprises a direct memory access unit, a plurality of transit storage units, a data type identification unit, and an IP address matching unit, wherein,
   the direct memory access unit is used for receiving the data transmission instruction of the local cluster control unit, and controlling the transit storage unit, data type identification unit, IP address matching unit and data volume detection unit;
   the data type identification unit is used for recognizing the type of the received data;
   the IP address matching unit is used for matching the received data with the a pre-assigned internet protocol version 6 (IPv6) address, to determine accurate data sources; and
   the transit storage unit is used for sorted storing of the data submitted by the stage equipment data extraction unit, stage personnel data extraction unit and stage field data extraction unit according to the data types and the matched IPv6 address.

3. The system according to claim 2, wherein the direct memory access unit comprises a buffering relay unit, which comprises a first first-in first-out buffer and a second first-in first-out buffer.

4. The system according to claim 3, wherein the direct memory access unit further comprises a finite high-speed storage collection, which comprises two sets of configuration registers and a set of state registers, the two sets of configuration registers are used to control each data stream communication of the self-adaptive multi-dimensional transmission processing unit, in turn, and the set of state registers is used to start the self-adaptive multi-dimensional transmission processing unit and reflect the transmission state of the self-adaptive multi-dimensional transmission processing unit.

5. The system according to claim 4, wherein the direct memory access unit further comprises an interface control sequence unit, which comprises a state recognizer, when the self-adaptive multi-dimensional transmission processing unit has access to the data extraction unit, the state recognizer directly controls the interface signal of receiving or transmitting data of the distributed data extraction unit, and detects the working condition of the data extraction unit in a real-time manner.

* * * * *